June 3, 1930. G. W. MORRISON 1,760,991
TRANSMISSION
Filed May 16, 1929
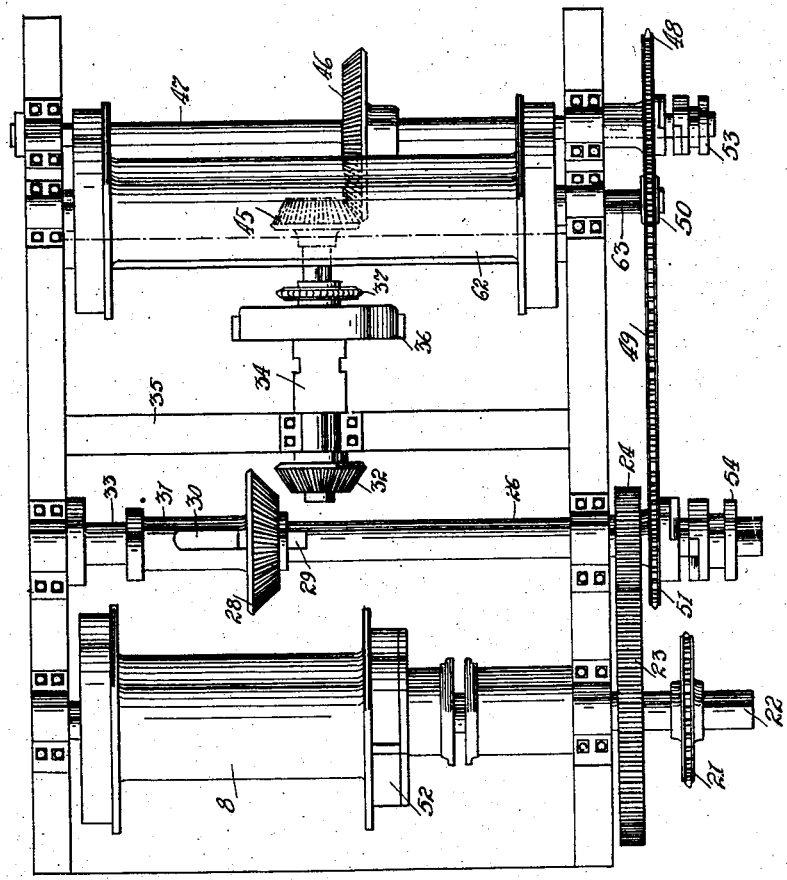
G. W. Morrison
INVENTOR.
BY Ernest A. Wood
ATTORNEY.

Patented June 3, 1930

1,760,991

UNITED STATES PATENT OFFICE

GEORGE WILLIAM MORRISON, OF HOLLIDAY, TEXAS

TRANSMISSION

Application filed May 16, 1929. Serial No. 364,287.

This invention relates to transmissions and more particularly to transmissions for oil field operations, and the primary object thereof is to provide a novel type of transmission of simple and compact form to enable different speeds to be obtained, as will be hereinafter noted.

The present application contains part of the subject matter disclosed in my abandoned application Ser. No. 105,093 filed April 28, 1926.

In the drawings:

The figure is a top plan view illustrating the transmission.

In proceeding in accordance with the present invention a suitable frame has a drum 8 mounted thereon, the drum being employed for winding a line (not shown). The drum is mounted upon a shaft 22, the latter having a sprocket 21 thereon from which latter power may be transmitted to any suitable point for example, for operating the mast or for use in pulling rods and tubing. The shaft 22 carries a large gear 23 which meshes with a smaller gear 24 on a shaft 26. A beveled gear 28 is also mounted on shaft 26 between the ends of the latter and has a key 29 affixed thereto, the latter operating in a slot 30 of the hub 31 of the gear 28. The hub 31 further has an annular groove 33 to receive a lever (not shown) for shifting the hub and thereby the gear axially of the shaft 26. A beveled gear 32 is designed to mesh with the beveled gear 28 and is mounted upon a longitudnial shaft 34 which latter extends at right angles to the shaft 26, the shaft being supported by a cross member 35 of the frame structure. The shaft 34 is relatively short and has a sprocket 37 thereon and a friction clutch 36, the latter controlling the movement of the sprocket 37. The sprocket 37 may derive power from any suitable source (not shown), by means of the customary sprocket chain (not shown).

A shaft 47 parallel to shaft 26 is spaced from the latter and in such space the short shaft 34 is disposed. The shaft 34 further has a beveled gear 45 in mesh with a gear 46 on the shaft 47. A sprocket 48 is mounted on the shaft 47 and which is engaged by a sprocket chain 49, the latter engaging a sprocket 51 on shaft 26. The chain 49 further engages a sprocket 50 on shaft 63, the latter supporting a drum 62. Clutches 53 and 54 are respectively carried by the shafts 47 and 26 in order to control the drive of the chain 49 through the respective sprockets 48 and 51.

From the foregoing it will be seen that rotation of shaft 26 through sprocket chain 49 results in the rotation of gear 23 through gear 24 thereby rotating the drum 8, thus obtaining a slow speed of the latter. If the drum 8 is to be rotated at high speed, power is transmitted from the sprocket 37 to beveled gear 32 thence to beveled gear 28 whereupon the gear 24 is caused to rotate to actuate the large gear 23. The drum 8 is loose on the shaft 22 and is connected thereto by a friction clutch 52.

It will be understood that the invention is capable of being employed for a variety of uses such as are necessary in oil field operations, and that the sprocket 37 may be actuated from the transmission of the truck, if desired.

What is claimed is:

A transmission for mast raising and lowering devices, composed of a drum, a gear connected to the drum, a shaft adjacent the drum having a gear in mesh with the drum gear, a second shaft spaced from the first shaft, means to drive the first shaft from the second shaft, a third shaft disposed transversely across the space between the first and second shafts, means to drive the second shaft from the third shaft, means to selectively drive the first shaft from the third shaft, and a clutch for each of the first and second shafts for controlling said means which drives the first shaft from the second shaft.

In testimony whereof I affix my signature.

GEORGE WILLIAM MORRISON.